US010535907B2

United States Patent
Reitzle et al.

(10) Patent No.: US 10,535,907 B2
(45) Date of Patent: Jan. 14, 2020

(54) DEVICE AND METHOD FOR CONTROLLING THE TEMPERATURE OF AN ELECTRIC ENERGY STORE OF A VEHICLE

(71) Applicants: Robert Bosch GmbH, Stuttgart (DE); Samsung SDI Co., Ltd., Yongin-si, Gyeonggi-do (KR)

(72) Inventors: Alexander Reitzle, Neu-Ulm (DE); Sarmimala Hore, Stuttgart (DE); Markus Hald, Jagstzell (DE)

(73) Assignees: Robert Bosch GmbH, Stuttgart (DE); Samsung SDI Co., Ltd, Yongin-si, Gyeonggi-do (KR)

( * ) Notice: Subject to any disclaimer, the term of this patent is extended or adjusted under 35 U.S.C. 154(b) by 627 days.

(21) Appl. No.: 15/114,742

(22) PCT Filed: Jan. 23, 2015

(86) PCT No.: PCT/EP2015/051391
§ 371 (c)(1),
(2) Date: Jul. 27, 2016

(87) PCT Pub. No.: WO2015/110597
PCT Pub. Date: Jul. 30, 2015

(65) Prior Publication Data
US 2016/0351982 A1      Dec. 1, 2016

(30) Foreign Application Priority Data

Jan. 27, 2014   (DE) .................. 10 2014 201 361

(51) Int. Cl.
*H01M 10/663*   (2014.01)
*H01M 10/48*    (2006.01)
(Continued)

(52) U.S. Cl.
CPC ....... *H01M 10/663* (2015.04); *H01M 10/486* (2013.01); *H01M 10/613* (2015.04);
(Continued)

(58) Field of Classification Search
CPC ............. H01M 10/613; H01M 10/663; H01M 10/615; H01M 10/625; H01M 10/6561;
(Continued)

(56) References Cited

U.S. PATENT DOCUMENTS 5,167,129 A * 12/1992 Akasaka ................ B60H 1/008
165/43
5,490,572 A * 2/1996 Tajiri .................. B60H 1/00278
180/65.1
(Continued)

FOREIGN PATENT DOCUMENTS

CN        103358851 A     10/2013
DE   10 2008 056 787 A1    5/2010
(Continued)

OTHER PUBLICATIONS

International Search Report corresponding to PCT Application No. PCT/EP2015/051391, dated Mar. 31, 2015 (German and English language document) (7 pages).

*Primary Examiner* — Amy Cohen Johnson
*Assistant Examiner* — Paul D Baillargeon
(74) *Attorney, Agent, or Firm* — Maginot, Moore & Beck LLP

(57) ABSTRACT

A device for controlling a temperature of an electric energy store of a vehicle includes a first flow path which opens into a housing of the electric energy store and has an air conditioning system for air-conditioning a passenger compartment of the vehicle. The air conditioning system includes a heating and/or cooling device and a second flow path which leads from the at least one heating and/or cooling
(Continued)

device into the passenger compartment. The two flow paths are connected in the device such that an airflow in one of the two flow paths is fluidically independent of an airflow in the respective other of the two flow paths. The device has a heat exchanger which is connected in the two flow paths for a pure heat exchange between the air flows in the two flow paths.

10 Claims, 2 Drawing Sheets

(51) Int. Cl.
H01M 10/625 (2014.01)
H01M 10/615 (2014.01)
H01M 10/6561 (2014.01)
H01M 10/613 (2014.01)

(52) U.S. Cl.
CPC ....... *H01M 10/615* (2015.04); *H01M 10/625* (2015.04); *H01M 10/6561* (2015.04); *H01M 2220/20* (2013.01)

(58) Field of Classification Search
CPC .......... B60H 1/00278; B60H 2001/003; B60L 11/1874; B60L 11/1875
See application file for complete search history.

(56) References Cited

U.S. PATENT DOCUMENTS

| 7,975,637 | B1 | 7/2011 | Nida |
| 2012/0003910 | A1* | 1/2012 | Richter .............. B60H 1/00278 454/141 |
| 2013/0140001 | A1 | 6/2013 | Mandl |

FOREIGN PATENT DOCUMENTS

| DE | 10 2010 030 892 A1 | 1/2012 |
| DE | 10 2012 223 054 A1 | 6/2013 |
| FR | 949096 A | 8/1949 |
| JP | 3145757 A | 3/2001 |

\* cited by examiner

DEVICE AND METHOD FOR CONTROLLING THE TEMPERATURE OF AN ELECTRIC ENERGY STORE OF A VEHICLE

This application is a 35 U.S.C. § 317 National Stage Application of PCT/EP2015/051391, filed on Jan. 23, 2015, which claims the benefit of priority to Serial No. DE 10 2014 201 361.5, filed on Jan. 27, 2014 in Germany, the disclosures of which are incorporated herein by reference in their entirety.

The disclosure relates to a device for controlling the temperature of an electric energy store, in particular of a rechargeable battery, of a vehicle, having a first flow path which opens into a housing of the electric energy store, and having a ventilation system for temperature-controlled ventilation of a passenger compartment of the vehicle, which ventilation system has a heating and/or cooling device and a second flow path which leads from the at least one heating and/or cooling device into the passenger compartment. The disclosure also relates to a corresponding vehicle and to a corresponding method for controlling the temperature of an electric energy store of a vehicle.

BACKGROUND

Vehicles with an electric or hybrid drive require electric energy stores, such as for example rechargeable traction batteries, to operate their electric drive unit. At present, these traction batteries are usually embodied as lithium-ion batteries. Such rechargeable batteries of electric vehicles or hybrid vehicles generate heat owing to the high currents which flow during their operation, and this heat has to be discharged. The cooling takes place either by means of a built-in cooling device or by cooling by means of the dynamic wind.

The temperature in passenger compartments of vehicles is dependent on the ambient conditions, for example the external temperature or solar radiation. Therefore, the vehicles are generally provided with a ventilation system with heating and/or cooling devices, for the temperature-controlled ventilation of the passenger compartment.

FR 2 949 096 A3 discloses an electric vehicle having a device for controlling the temperature of a rechargeable traction battery of the vehicle. This device comprises a first flow path which opens into a housing of the electric energy store and has a ventilation system for temperature-controlled ventilation of a passenger compartment of the vehicle, which ventilation system has a heating device and a second flow path which leads from the at least one heating and/or cooling device into the passenger compartment. The device has a supply air inlet for air from the surroundings of the vehicle, which supply air inlet is configured to divide a supply airflow into a first partial flow and a second partial flow, wherein the first partial flow is fed to the first flow path and the second partial flow to the passenger compartment. The first flow path opens into a housing of the traction battery. During ongoing operation, the battery heats up and therefore forms a heating device of the ventilation system of a passenger compartment. The second flow path leads from the battery functioning as a heating device of the ventilation system into the passenger compartment of the electric vehicle. In this context, the battery is cooled and the passenger compartment is heated. In the case of cold temperature, the battery in the quiescent state assumes the low external temperature, which can lead to a power drop of the battery. The temperature control of the electric energy store is therefore possible only to a limited extent by means of this device.

The device, the vehicle and the method according to the disclosure provide the advantage that both electric energy store and the passenger compartment can be temperature-controlled satisfactorily without components of the waste air of the electric energy store which are damaging to passengers in order to enter the passenger compartment.

In the device according to the disclosure there is provision that the two flow paths are connected in the device in such a way that an airflow in each case one of the two flow paths is fluidically independent of an airflow in the respective other of the two flow paths, wherein the device has a heat exchanger, connected in both flow paths, for pure heat exchange between the airflows in the two flow paths. However, this heat exchanger does not permit mixing of these airflows. As a result of the purely thermal connection of the first flow path to the ventilation system of the device, the heating and/or cooling device thereof can also be used to heat and/or cool the electric energy store without components of the waste air of the electric energy store which are damaging to passengers being able to enter the passenger compartment.

The device for controlling the temperature of the electric energy store uses the ventilation system present in many vehicles to perform temperature-controlled ventilation of the passenger compartment of the vehicle. It is therefore, to be precise, a device for controlling the temperature of the electric energy store and for temperature-controlled ventilation of the passenger compartment of the vehicle.

According to one advantageous development of the disclosure, the device also has an air inlet for air from the surroundings of the vehicle. The air inlet is configured to divide an inflow into a first partial flow and a second partial flow, and the first partial flow is fed to the first flow path, and the second partial flow is fed to an inlet of the ventilation system. The air flows are therefore already separated from one another completely when they enter the vehicle.

Generally, the ventilation system can, of course, have any type of heating and/or cooling device such as, for example, a cooling machine, an electric heater, a Peltier element etc. There is advantageously provision that the heating and/or cooling device has a cooling compressor and/or a stationary mode heater.

According to an advantageous embodiment of the disclosure, the device for controlling the temperature of the electric energy store has a first temperature regulating device which itself has a temperature sensor for determining the temperature of the electric energy store and an actuator element for changing the throughflow of the airflow in the first flow path. The sensor is preferably arranged directly on the electric energy store or at least in the corresponding housing.

According to yet another advantageous embodiment of the disclosure, the ventilation system has a second temperature regulating device which itself has a temperature sensor for determining the temperature in the passenger compartment and an actuator element for changing the throughflow of the airflow in the second flow path. The sensor is preferably arranged in the passenger compartment.

Finally, there is advantageously provision that the device has a first air discharge duct for discharging air from the housing of the energy store, and that the ventilation system has a second air discharge duct for discharging air from the passenger compartment, through which air discharge ducts the respective waste air can be discharged into the surroundings of the vehicle. In this context, the ventilation system has, in particular, a return duct, connecting the second air discharge duct to the inlet of the ventilation system, for an air circulation mode of the ventilation system.

The vehicle according to the disclosure has a passenger compartment, an electric energy store and a device for controlling the temperature of the electric energy store, which device comprises itself the following components: (i) a first flow path which leads to the electric energy store and (ii) a ventilation system for temperature-controlled ventilation of a passenger compartment of the vehicle, which ventilation system has a second flow path which leads to the passenger compartment. There is provision here that the device is embodied as a device as specified above. The vehicle is, in particular, an electric vehicle or hybrid vehicle. The electric energy store serves to supply electrical energy to an electric drive of this vehicle and is embodied, in particular, as a rechargeable traction battery.

In the method according to the disclosure for controlling the temperature of the electric energy store of a vehicle by means of a ventilation system for temperature-controlled ventilation of a passenger compartment of the vehicle, a temperature-controlled airflow is fed to the electric energy store by a first flow path, wherein the ventilation system feeds an airflow to the passenger compartment via a second flow path. There is provision that both flow paths lead through a heat exchanger, wherein the airflow which is fed to the energy store is temperature-controlled in the heat exchanger by a transfer of heat between the airflows.

Additional cooling devices for the electric energy store are eliminated by virtue of the purely thermal connection of the first flow path to the ventilation system for temperature-controlled ventilation of a passenger compartment.

When it is low temperatures, the electric energy store is heated, and therefore no reductions in capacity occur. At high temperatures, it is cooled, thereby avoiding overheating of the electric energy store.

According to one advantageous development of the disclosure there is provision that a supply airflow of air from the surroundings of the vehicle is divided in a supply air inlet into a first partial flow and a second partial flow, wherein the first partial flow is fed to the first flow path and the second partial flow to the ventilation system.

BRIEF DESCRIPTION OF THE DRAWINGS

The disclosure will be explained in more detail below with reference to the figures, in which.

DETAILED DESCRIPTION

Figure 1:
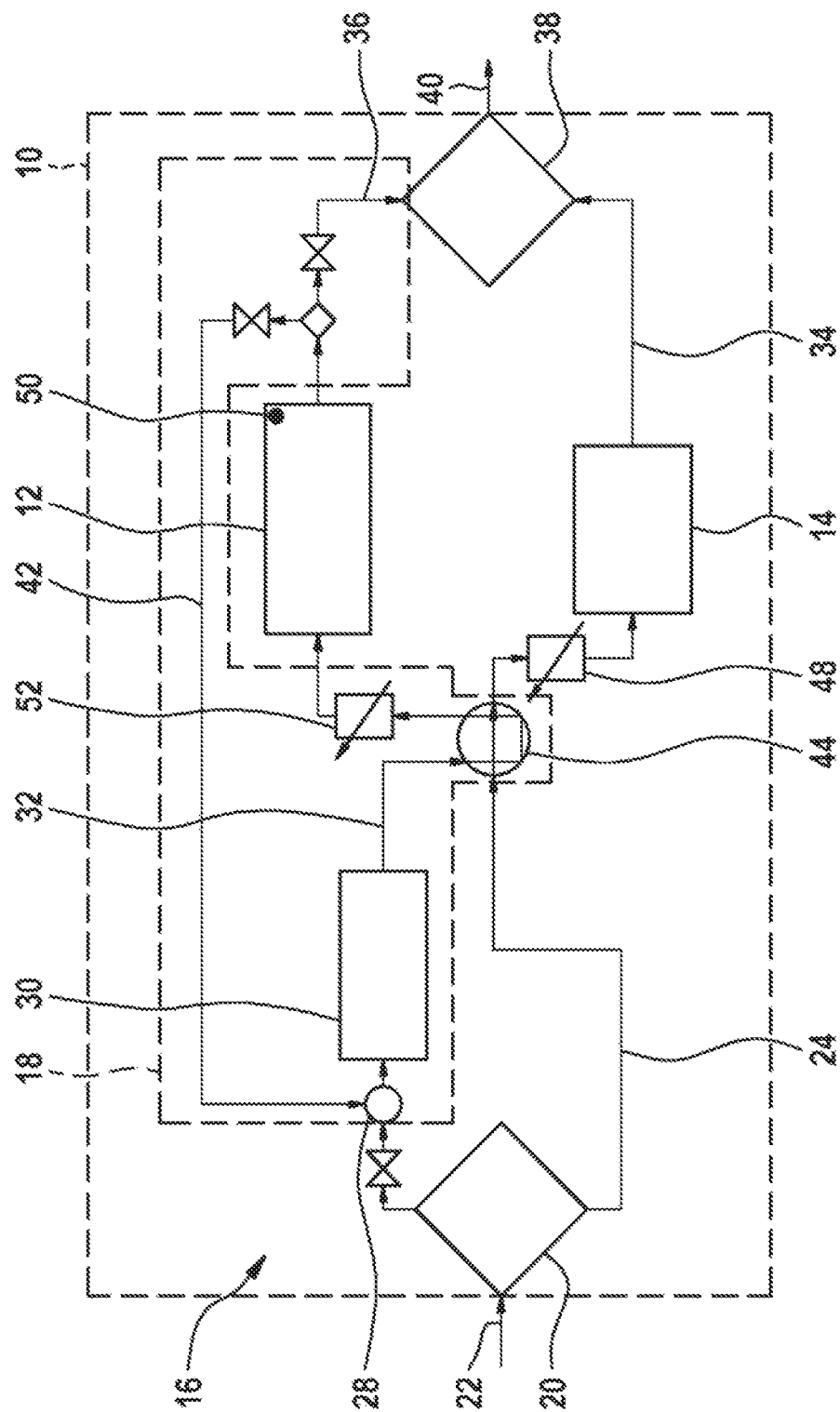
FIG. 1 shows a schematic illustration of a vehicle with a passenger compartment, an electric energy store and a device for controlling the temperature of the electric energy store according to one preferred embodiment of the disclosure.

FIG. 1 shows a schematic illustration of a vehicle 10 with a passenger compartment 12 and electric energy store 14 which is embodied as a battery. The vehicle 10 is an electric vehicle or hybrid vehicle whose electric drive machine (not illustrated) is supplied with electric energy by means of the electric energy store 14. The vehicle 10 has a device 16 for controlling the temperature of the electric energy store 14 and for temperature-controlled ventilation of the passenger compartment 12, said device 16 having a customary ventilation system 18 for a temperature-controlled ventilation of a passenger compartment 12 and optionally also other interior spaces of the vehicle 10. The device 16 has a supply air inlet 20 for air from the surroundings of the vehicle, which supply air inlet 20 divides a supply airflow (arrow 22) into a first partial flow and a second partial flow. The first partial flow is fed to a first flow path 24 which opens into a housing 26 (shown in FIG. 2) of the electric energy store 24. The second partial flow is fed to an inlet 28 of the ventilation system 18. The ventilation system 18 for temperature-controlled ventilation of the passenger compartment 12 has a heating and/or cooling device 30 and a second flow path 32 which leads from the heating and/or cooling device 30 into the passenger compartment 12. The heating and/or cooling device 30 comprises, for example a cooling compressor (not shown) and a stationary-mode heater (not shown either).

The first flow path 24 and the second flow path 32 are connected within the device 16 in such a way that an airflow in, in each case, one of the two flow paths 24, 32 is fluidically independent of an airflow in the respective other of the two flow paths 32, 24.

The device 16 also has a first air discharge duct 34 for discharge of air from the housing 26 of the energy store 14, and the ventilation system 18 has a second air discharge duct 36 for discharge of air from the passenger compartment 12, through which air discharge ducts 34, 36 the respective waste air can be discharged into the surroundings of the vehicle via a common air outlet 38 (arrow 40). The ventilation system 18 also comprises a return duct 42, connecting the second air discharge duct 36 to the inlet 28 of the ventilation system 18, for an air circulation mode of the ventilation system 18.

The device 16 for controlling the temperature of the electric energy store 14 and for temperature-controlled ventilation of the passenger compartment 12 also has a heat exchanger 44, connected in flow paths 24, 32, for pure heat exchange between the airflows in the two flow paths 24, 32. Furthermore, the device 16 for controlling the temperature of the electric energy store 14 has a first temperature regulating device which a temperature sensor 46 (not shown in FIG. 2) for determining the temperature of the energy store 14 and an actuator element 48 for changing the throughflow of the airflow in the first flow path 24 on.

The ventilation system 18 finally has a second temperature regulating device which itself has a temperature sensor 50 for determining the temperature in the passenger compartment 12 and an actuator element 52 for changing the flow of the airflow in the second flow path 32.

Figure 2:
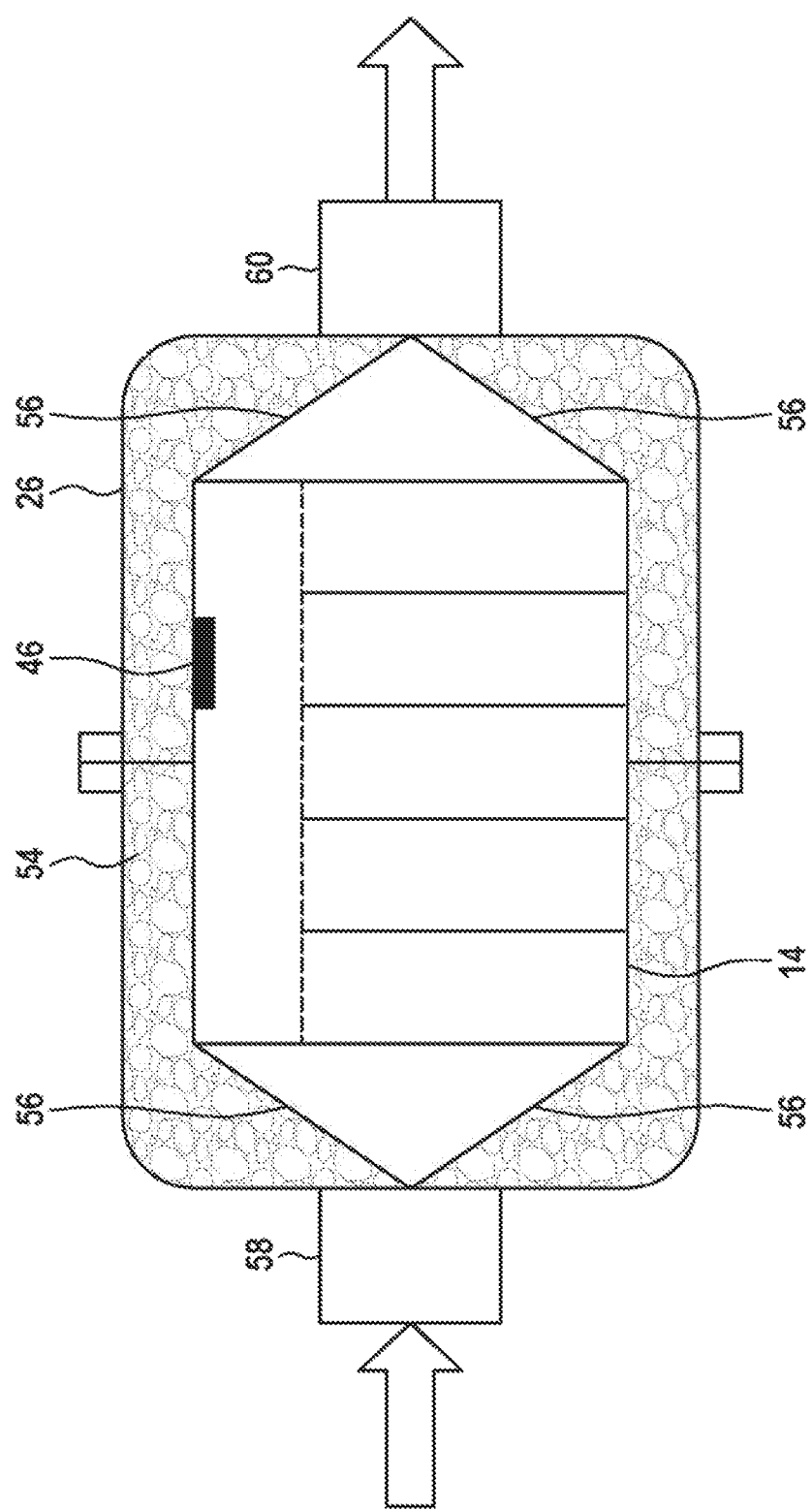
FIG. 2 shows the design of a housing of the electric energy store.

FIG. 2 shows the electric energy store 14, embodied as a battery, in its housing 26. The entire electric energy store 14 is mounted in a the housing 26, for example a casing which is filled with a filler material 54. A customary crash frame can be integrated into this housing. The filler material 54 has certain mechanical strength and has both mechanical damping properties and thermal insulation properties. By virtue of the structure, for example lattice or honeycomb structure, the air can flow therein about the electric energy store 14 with the aid of baffle plates 56, and control the temperature of said energy store. Shocks and vibrations are clamped by the filler material 54. In addition, the temperature of the energy store 14 can be maintained by means of its thermal insulation effect in the case of a brief stop of the vehicle. The necessary electric connections of the electric energy store 14 are led to said energy store through the housing and the filler material 54. The housing 26 has an inlet 58 for connecting to the first flow path 24, and an outlet 60 for connecting to the first air discharge duct 34.

The following situation arises:

Temperatures around 293K (20° C.) in the passenger compartment 12 of the vehicle 10 are felt to be pleasant by the passengers. For this purpose, the air in the passenger compartment 12 has to be cooled at high temperatures and heated at low temperatures. In the case of lithium-ion batteries or similarly electric energy stores, a similar operating temperature is aimed at. In the text which follows, the situation with respect to rechargeable batteries will be described. However, the situations can be transmitted to other electric energy stores without restrictions.

FIG. 1 is a schematic illustration of the process. The ambient air passes supply air into the vehicle 10. The airflow is divided into two partial flows. This ensures that no damaging materials which are possibly produced in the battery can enter the passenger compartment 12. A portion of the supply air enters the ventilation system 18. The latter contains, for optimum temperature control of the passenger compartment, inter alia a cooling compressor (air conditioning system) and a stationary mode heater, but both are not necessarily required. The temperature of the airflow is controlled in accordance with the desired temperature in the passenger compartment 12.

The ambient temperature $(T_U)$<temperature in the passenger compartment $(T_F)$: the supply air is heated.

$T_U \geq T_F$: supply air is cooled if an air conditioning system is present, otherwise the air flows on without temperature control.

This constitutes a simple temperature regulation for the passenger compartment 12. Relatively complex regulation means also possible for increasing the comfort of the passengers.

By using the stationary mode heater it is possible to approximate the temperature in the passenger compartment $T_F$ and the battery to the desired temperature even before the start of the vehicle given relatively low ambient temperatures $T_U$. Subsequently, the temperature-controlled supply air flows through the heat exchanger 44 in which the temperature of the airflow which leads to the battery via the first flow path 24 is controlled. In the case of the heat exchanger 44, it is necessary to ensure for both airflows that condensate which is possibly produced can be precipitated and that it is carried away.

Subsequently, the airflow in the second flow path 32 compresses via the actuator element 52 which regulates the volume flow of this airflow, into the passenger compartment 12 in order then to leave the vehicle 10 as waste air.

In the case of the airflow which is fed to the battery via the first flow path 24, the actuator element 48 which is arranged downstream of the heat exchanger 44 regulates the volume flow of the airflow. After the temperature control of the battery, said airflow leaves the vehicle 10 as waste air.

The temperature of the passenger compartment 12 is controlled by means of the circulated air (air circulation mode of the ventilation system 18), the airflows from the passenger compartment 12 and back into the front part of the ventilation system 18, which part has the heating and/or cooling device 30. In the case of the air circulation mode of the ventilation system 18, the supply of fresh supply air from the surroundings of the vehicle is interrupted.

The regulation of the battery temperature is carried out by means of the temperature sensor 46 in the housing 26 of the battery and the actuator element 48 which is mounted upstream of the temperature sensor 46. In this context, the following simple regulation process is possible, which regulation process can be refined by taking into account further interference variables, for example instantaneously required power:

Set point temperature of the battery $(T_s)$<actual temperature of the battery $(T_B)$:
  Temperature of supply air $(T_Z)$<actual temperature of the battery $(T_B)$: battery is cooled.
  $T_Z > T_B$: airflow is interrupted.
$T_s > T_B$:
  $T_Z > T_B$: battery is heated.
  $T_Z < T_B$: airflow is interrupted.

The invention claimed is:

1. A device for controlling a temperature of an electric energy store of a vehicle, comprising:
   a first flow path opening into a housing of the electric energy store;
   a ventilation system for temperature-controlled ventilation of a passenger compartment of the vehicle, the ventilation system having a heating and/or cooling device and a second flow path leading from the at least one heating and/or cooling device into the passenger compartment;
   a supply air inlet configured to receive an inflow of air from a surroundings of the vehicle, divide the inflow into a first partial flow and a second partial flow, feed the first partial flow to the first flow path, and feed the second partial flow to an inlet of the ventilation system; and
   a heat exchanger connected in the first and the second flow paths,
   wherein the two flow paths are connected in the device such that an airflow in, in each case, one of the two flow paths is fluidically independent of an airflow in the respective other of the two flow paths, and
   wherein the heat exchanger is configured for pure heat exchange between the airflows in the two flow paths.

2. The device as claimed in claim 1, wherein the heating and/or cooling device has a cooling compressor and/or a stationary-mode heater.

3. The device as claimed in claim 1, further comprising:
   a first temperature regulating device having a temperature sensor configured to determine a temperature of the electrical energy store and an actuator element configured to change a throughflow of the airflow in the first flow path.

4. The device as claimed in claim 3, wherein the ventilation system has a second temperature regulating device having a temperature sensor configured to determine a temperature in the passenger compartment and an actuator element configured to change a throughflow of the airflow in the second flow path.

5. The device as claimed in claim 1, further comprising:
   an air discharge duct configured to discharge air from the housing of the electrical energy store,
   wherein the ventilation system has a second air discharge duct configured to discharge air from the passenger compartment, through which air discharge ducts respective waste air is discharged to the surroundings of the vehicle.

6. The device as claimed in claim 5, wherein the ventilation system has a return flow duct, connecting the second air discharge duct to the inlet of the ventilation system, for an air circulation mode of the ventilation system.

7. A vehicle having a passenger compartment, an electric energy store, and a device for controlling a temperature of the electric energy store, the device comprising:
   a first flow path leading to the electric energy store;

a ventilation system for temperature-controlled ventilation of the passenger compartment, the ventilation system having a heating and/or cooling device and a second flow path leading to the passenger compartment;

a supply air inlet configured to receive an inflow of air from a surroundings of the vehicle, divide the inflow into a first partial flow and a second partial flow, feed the first partial flow to the first flow path, and feed the second partial flow to an inlet of the ventilation system; and a heat exchanger connected in both flow paths, wherein the first flow path opens into a housing of the electric energy store, wherein the two flow paths are connected in the device such that an airflow in, in each case, one of the two flow paths is fluidically independent of an airflow in the respective other of the two flow paths, and wherein the heat exchanger is configured for pure heat exchange between the airflows in the two flow paths.

8. A method for controlling a temperature of an electric energy store of a vehicle with a ventilation system for temperature-controlled ventilation of a passenger compartment of the vehicle, comprising:

dividing a supply airflow of air from a surroundings of the vehicle in a supply air inlet into a first partial flow and a second partial flow;

feeding the first partial flow to a first flow path;

feeding the second partial flow to an inlet of the ventilation system;

feeding a temperature-controlled airflow to the electric energy store by the first flow path, the first flow path leading through a heat exchanger;

feeding an airflow to the passenger compartment via a second flow path with the ventilation system, the second flow path leading through the heat exchanger; and temperature controlling the airflow which is fed to the energy store in the heat exchanger by a transfer of heat between the airflows.

9. The method as claimed in claim 8, wherein the divided first partial flow is fluidically independent from the divided second partial flow.

10. The method as claimed in claim 8, wherein the airflow which is fed to the energy store is temperature controlled in the heat exchanger by pure heat exchange between the airflows.

* * * * *